US008727058B2

(12) United States Patent
Nakano

(10) Patent No.: US 8,727,058 B2
(45) Date of Patent: May 20, 2014

(54) SADDLE TYPE VEHICLE

(75) Inventor: Junichi Nakano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 13/349,956

(22) Filed: Jan. 13, 2012

(65) Prior Publication Data

US 2012/0181783 A1 Jul. 19, 2012

(30) Foreign Application Priority Data

Jan. 17, 2011 (JP) ................................. 2011-007335

(51) Int. Cl.
*B62D 61/02* (2006.01)
*B62K 11/02* (2006.01)

(52) U.S. Cl.
USPC ........... 180/219; 180/227; 180/228; 280/274; 280/281.1

(58) Field of Classification Search
USPC .................. 180/219, 227, 228, 230; 280/274, 280/281.1, 835
See application file for complete search history.

(56) References Cited

U.S. PATENT DOCUMENTS

| 4,340,125 | A | * | 7/1982 | Watanabe et al. | 180/215 |
|---|---|---|---|---|---|
| 4,460,057 | A | * | 7/1984 | Kohyama | 180/210 |
| 4,700,795 | A | * | 10/1987 | Yashima et al. | 180/68.5 |
| 4,721,178 | A | * | 1/1988 | Ito | 180/215 |
| 4,964,483 | A | * | 10/1990 | Yokoyama et al. | 180/219 |
| 5,433,286 | A | * | 7/1995 | Kumamaru et al. | 180/219 |
| 5,704,442 | A | * | 1/1998 | Okazaki et al. | 180/219 |
| 6,349,785 | B1 | * | 2/2002 | Ohmika et al. | 180/227 |
| 6,986,400 | B2 | * | 1/2006 | Osada | 180/228 |
| 7,134,706 | B2 | * | 11/2006 | Michisaka et al. | 296/97.22 |
| 7,270,213 | B2 | * | 9/2007 | Suzuki et al. | 180/219 |
| 8,215,677 | B2 | * | 7/2012 | Hosoya et al. | 280/835 |
| 8,439,145 | B2 | * | 5/2013 | Yamada et al. | 180/219 |
| 8,584,784 | B2 | * | 11/2013 | Nagura et al. | 180/228 |
| 2001/0028168 | A1 | * | 10/2001 | Nakagawa | 280/830 |
| 2004/0238253 | A1 | * | 12/2004 | Yonehana et al. | 180/219 |
| 2005/0133283 | A1 | * | 6/2005 | Horii | 180/65.1 |
| 2006/0086553 | A1 | * | 4/2006 | Chen | 180/208 |
| 2007/0018420 | A1 | * | 1/2007 | Hoshi | 280/274 |
| 2007/0228689 | A1 | * | 10/2007 | Lin | 280/281.1 |
| 2008/0093146 | A1 | * | 4/2008 | Kobayashi | 180/219 |
| 2008/0211204 | A1 | * | 9/2008 | Lee et al. | 280/281.1 |

FOREIGN PATENT DOCUMENTS

JP 2008-279962 11/2008

* cited by examiner

*Primary Examiner* — Joseph M Rocca
*Assistant Examiner* — Marc A Scharich
(74) *Attorney, Agent, or Firm* — Rankin, Hill & Clark LLP

(57) ABSTRACT

A saddle type vehicle includes a head pipe that steerably supports a steering system including a front wheel, a main frame extending rearwardly downward from the head pipe, left and right lower frames extending substantially in parallel to each other rearward from a lower portion of the main frame, and a storage space provided between the left and right lower frames on the rear side of the main frame. The storage space permits a fuel tank as a vehicle component part to be disposed therein. A front cross frame is connected to a lower end portion of a main frame lower portion and extends in the vehicle width direction. Front end portions of the lower frames are connected to left and right end portions of the front cross frame.

14 Claims, 9 Drawing Sheets

SADDLE TYPE VEHICLE

BACKGROUND OF THE INVENTION

Field of the Invention

The present invention relates to a saddle type vehicle having a storage space between left and right lower frames.

In relation to saddle type vehicles, there has been known a configuration in which a main frame extending rearwardly downward from a head pipe and left and right lower frames extending substantially horizontally rearwardly from a lower portion of the main frame are provided. A storage space is provided between the pair of left and right lower frames, and a fuel tank as a vehicle component part is disposed in the storage space (see, for example, Japanese Patent Laid-open No. 2008-279962). In Japanese Patent Laid-open No. 2008-279962, those front end portions of the lower frames which extend respectively to the left and right sides are connected to lower portions of the main frame, and the lower frames are bent rearward at positions on the rear side of the front end portions and then extend rearward.

Meanwhile, in a saddle type vehicle, in order to contrive a more compact vehicle design while securing a large capacity of the above-mentioned storage space, it is desirable to have the storage space extend to a position as forward as possible. For instance, in the case where a fuel tank is disposed in the storage space, enlarging the storage space permits an enlarged capacity of the fuel tank. In the above-mentioned saddle type vehicle according to the related art, however, the space under the main frame is also used as storage space and the fuel tank is extended forward so as to even come under the main frame, resulting in a complicated structure.

SUMMARY OF THE INVENTION

The present invention has been made in consideration of the above-mentioned circumstances. Accordingly, it is an object of the present invention to ensure that, in a saddle type vehicle having a storage space between left and right lower frames, a larger capacity of the storage space can be secured with a simple structure.

In order to attain the above object, according to the present invention, there is provided a saddle type vehicle including a head pipe that steerably supports a steering system including a front wheel, a main frame extending rearwardly downward from the head pipe, and left and right lower frames extending substantially in parallel to each other rearward from a lower portion of the main frame. A storage space is provided between the left and right lower frames on the rear side of the main frame and is adapted to receive a vehicle component part or an article therein. A front cross frame is connected to a lower portion of the main frame and extends in a vehicle width direction. Front end portions of the lower frames are connected to left and right end portions of the front cross frame.

According to this configuration, the storage space is provided between the left and right lower frames extending rearward from a lower portion of the main frame, and front end portions of the lower frames are connected to left and right end portions of the front cross frame, which is connected to a lower portion of the main frame and extends in the vehicle width direction. This ensures that the front end portions of the lower frames can be extended more forward and can be disposed more to the outer sides in the vehicle width direction. Accordingly, an enlarged storage space can be secured with a simple structure.

In addition, in the above-mentioned configuration, the main frame may be bent in a rearwardly projecting shape at a bend point in the vicinity of a height-directionally middle part thereof or at a position below the middle part.

In this case, the main frame is bent in a rearwardly projecting shape at the bend point in the vicinity of the height-directionally middle part thereof or at a position below the middle part, whereby a lower portion of the main frame can be disposed on the more forward side while keeping the lower portion of the main frame from coming too close to the front wheel. Therefore, it is possible to secure a larger storage space by extending the storage space more forward, while securing a clearance between the front wheel and the main frame.

Besides, the storage space may be disposed to range to the front side of an extension line of a rear edge of the main frame above the bend point of the main frame, in side view.

In this case, the space obtained by bending the main frame forward can be used as storage space, so that an enlarged storage space can be secured with a simple structure.

In addition, a portion below the bend point of the main frame may extend forwardly downward. In this case, the portion below the bend point of the main frame extends forwardly downward and the lower portion of the main frame is located on the more forward side, so that a larger storage space can be securely obtained.

Further, a configuration may be adopted in which an energy storage box is disposed in the storage space.

In this case, the energy storage box being comparatively large in weight and volume can be disposed at the center of the vehicle body, which promises mass concentration.

Furthermore, the lower frames may extend rearward such that their lower edges extend along a lower surface of the energy storage box in side view.

In this case, since the lower frames extend rearward such that their lower edges extend along the lower surface of the energy storage box, the storage space for disposing the energy storage box therein can be secured in a maximized manner.

In addition, a configuration may be adopted in which the energy storage box is a fuel tank provided with a fuel pump, and the lower frames are each bent in a downwardly projecting shape so as to have a lowest point thereof at a position in the vicinity of the fuel pump in side view.

In this case, since the lower frames are each bent in a downwardly projecting shape so as to have the lowest point thereof at a position in the vicinity of the fuel pump in side view, the fuel pump can be guarded by the lower frames. As a result, the fuel pump can be simplified in structure.

Besides, a leg-passing space through which a driver can let his or her leg pass from one side to the other side of the vehicle at the time of getting on or off the vehicle may be provided between a driver seat and the head pipe, and the leg-passing space may be disposed to range to below the bend point.

In this case, since the leg-passing space between the seat and the head pipe is disposed to range to below the bend point, the leg-passing space can be broadened, and the driver can get on and off the saddle type vehicle more easily.

Further, a configuration may be adopted wherein the front cross frame is a single pipe extending rectilinearly in the vehicle width direction, openings at the left and right end portions of the front cross frame are closed with lid members, the lower frames have their front end portions welded to rear surfaces of the left and right end portions of the front cross frame, and the front end portions are cut out in conformity with the shape of a rear surface of the front cross frame.

In this case, provision of the lid members makes it possible to enhance rigidity of the end portions of the front cross frame. Besides, since the front end portions of the lower frames cut out in conformity with the shape of the rear surface of the front cross frame and are welded to the end portions of the front cross frame, the lower frames can be rigidly connected to the front cross frame.

In the saddle type vehicle according to the present invention, the storage space is provided between the left and right lower frames, and the front end portions of the lower frames are connected to the left and right end portions of the front cross frame, which is connected to a lower portion of the main frame and extends in the vehicle width direction. Therefore, the front end portions of the lower frames can be extended more forward and can be disposed on the more outer sides in the vehicle width direction. Accordingly, an enlarged capacity of the storage space can be secured with a simple structure.

In addition, since the main frame is bent in a rearwardly projecting shape, the lower portion of the main frame can be disposed on the more forward side while keeping the lower portion of the main frame from coming too close to the front wheel. Therefore, the capacity of the storage space can be enlarged by extending the storage space more forward while securing a clearance between the front wheel and the main frame.

Besides, the space obtained by bending the main frame forward can be used as storage space, so that an enlarged storage space can be securely obtained with a simple structure.

Further, since the portion below the bend point of the main frame extends forwardly downward and the lower portion of the main frame is located on the more forward side, an enlarged storage space can be secured.

Furthermore, the energy storage box being comparatively large in weight and volume can be disposed at the center of the vehicle body, which promises mass concentration.

In addition, since the lower frames extend rearward such that their lower edges extend along the lower surface of the energy storage box, the storage space for disposing the energy storage box therein can be secured in a maximized manner.

Besides, since the lower frames are each bent in a downwardly projecting shape so as to have the lowest point thereof at a position in the vicinity of the fuel pump in side view, the fuel pump can be guarded by the lower frames. Consequently, the fuel pump can be simplified in structure.

In addition, the leg-passing space between the seat and the head pipe is disposed to range to below the bend point, the leg-passing space can be broadened, and the driver can get on and off the saddle type vehicle more easily.

Further, since the rigidity of the end portions of the front cross frame can be enhanced by providing the lid members and the front end portions of the lower frames cut out in conformity with the shape of the rear surface of the front cross frame and are welded to the end portions of the front cross frame, the lower frames can be rigidly connected to the front cross frame.

BRIEF DESCRIPTION OF THE DRAWINGS

These and further features of the invention will be apparent with reference to the description and drawings, wherein.

DETAILED DESCRIPTION OF THE PREFERRED EMBODIMENTS

Figure 1:
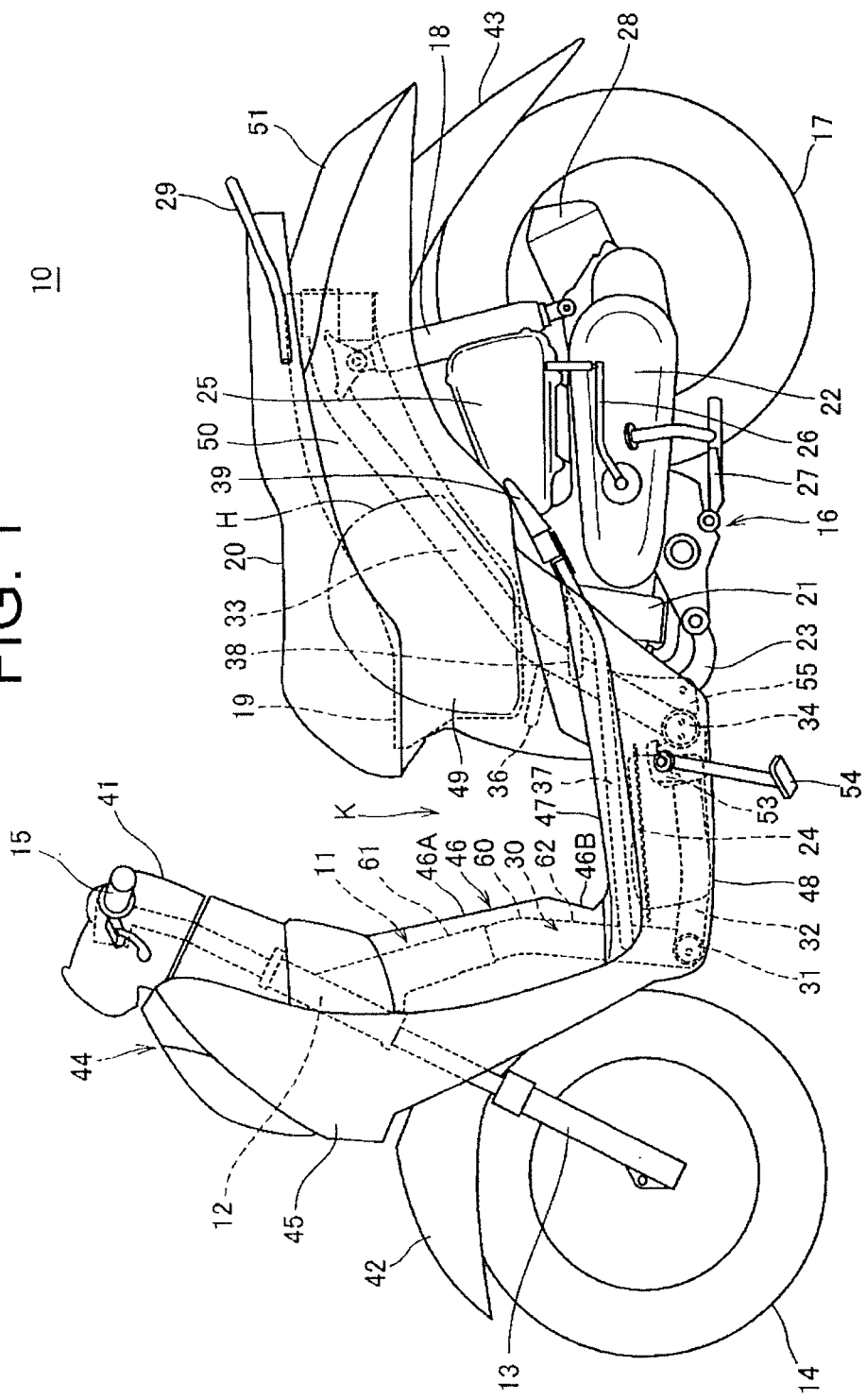
FIG. 1 is a left side view of a motorcycle according to the present invention.

Now, a motorcycle according to an embodiment of the present invention will be described below referring to the drawings. Incidentally, in the following description, the upper and lower, forward and rearward, and leftward and rightward directions indicate the respective directions as viewed from the driver on the vehicle.

FIG. 1 is a left side view of a motorcycle according to the present invention. The motorcycle 10 (saddle type vehicle) is a motor scooter type, saddle type vehicle which mainly includes: a body frame 11; a front fork 13 having a pair of left and right parts and mounted to a head pipe 12 at a front portion of the body frame 11; a front wheel 14 mounted on the lower ends of the front fork 13; a handle 15 attached to an upper portion of the front fork 13; a power unit 16 swingably mounted to a back-and-forth-directionally intermediate portion of the body frame 11; a rear wheel 17 mounted to a rear portion of the power unit 16; a rear cushion unit 18 extending between a rear end portion of the power unit 16 and a rear portion of the body frame 11; a luggage box 19 mounted to a rear portion of the body frame 11; a seat 20 which is disposed over the luggage box 19 and on which a driver is to be seated; a fuel tank 24; and a resin-made body cover 44 covering the body frame 11.

Figure 2:
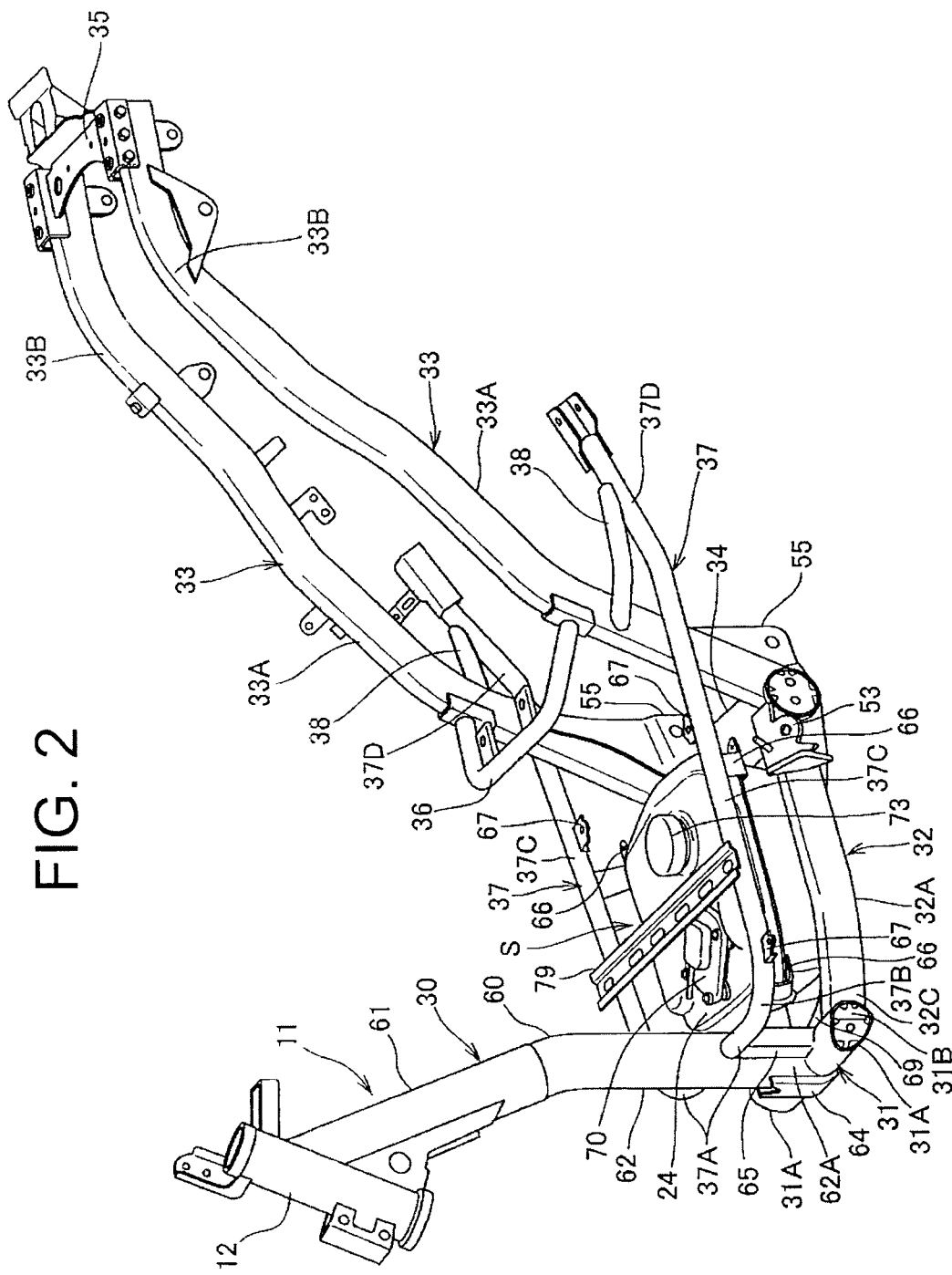
FIG. 2 is a perspective view of a body frame.
Figure 3:
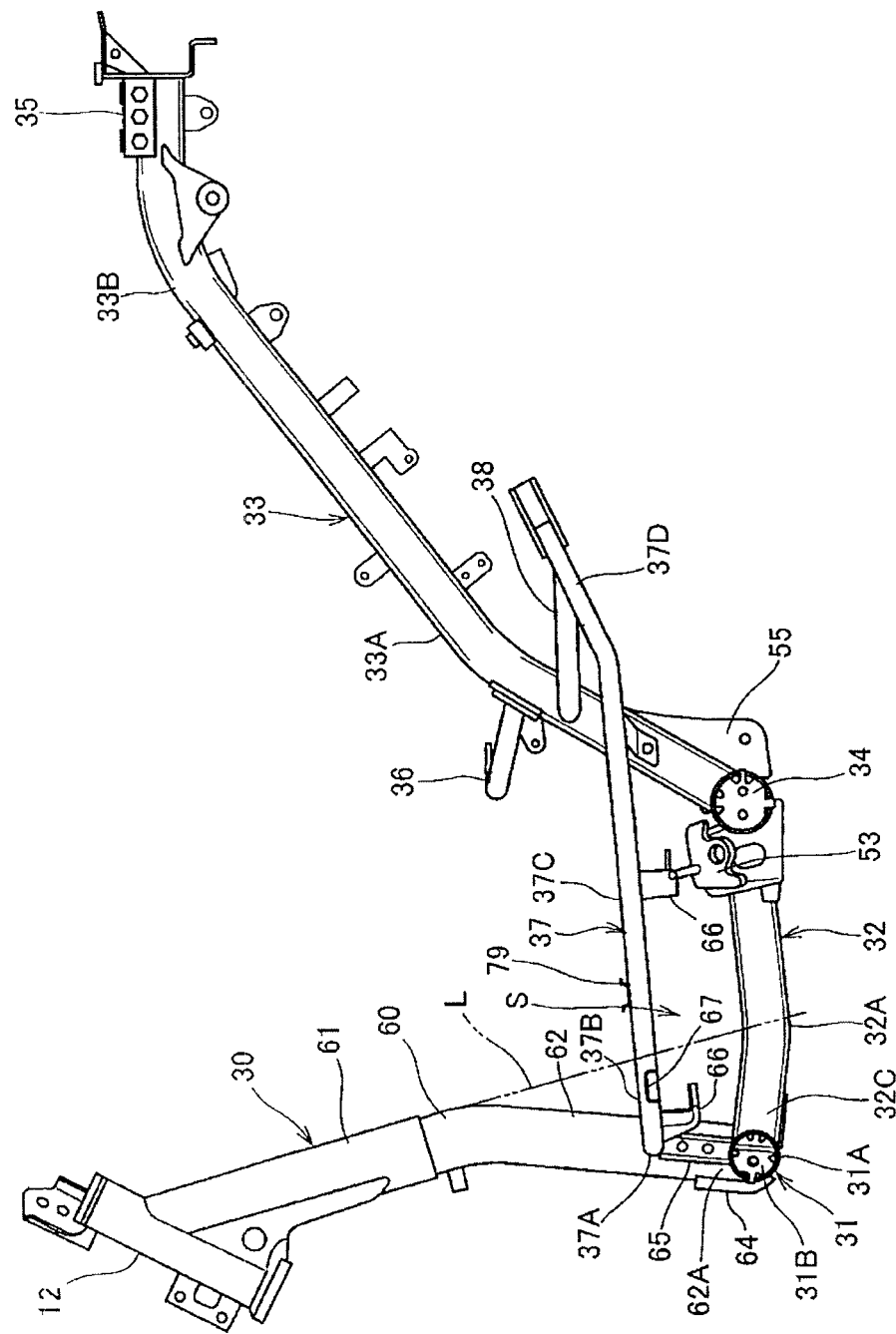
FIG. 3 is a left side view of the body frame.
Figure 4:
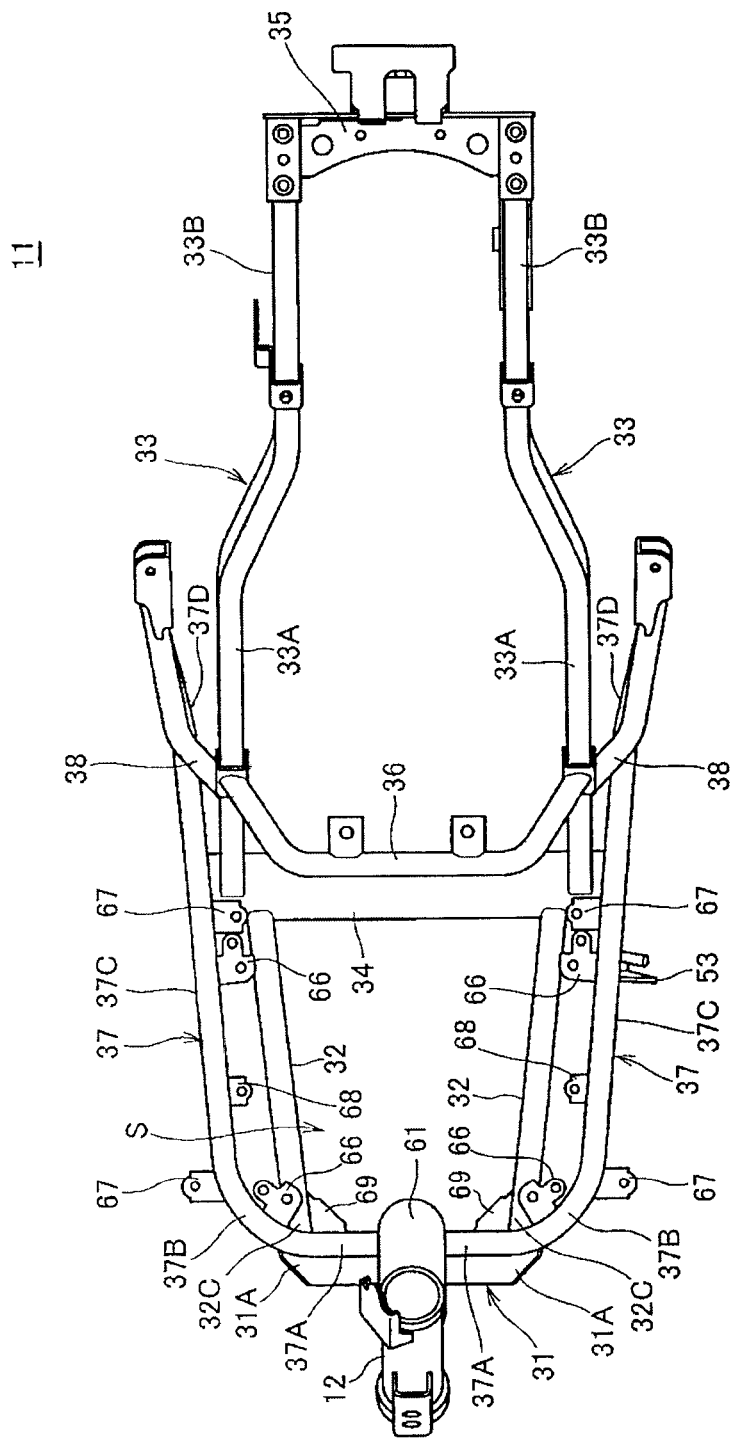
FIG. 4 is a plan view, as viewed from above, of the body frame.

FIG. 2 is a perspective view of the body frame 1. FIG. 3 is a left side view of the body frame 11. FIG. 4 is a plan view, as viewed from above, of the body frame 11.

As shown in FIGS. 1 to 4, the body frame 11 includes: the head pipe 12; a single main frame 30 extending rearwardly downward from a rear surface of the head pipe 12; a front cross frame 31 joined to a lower portion of the main frame 30 and extending in the vehicle width direction; left and right lower frames 32, 32 extending rearward from left and right ends of the front cross frame 31; a center cross pipe 34 provided at rear portions of the lower frames 32, 32 and interconnecting the left and right lower frames 32, 32; and rear frames 33, 33 extending rearwardly upward from the center cross pipe 34 to a vehicle rear portion.

A steering system including the front wheel 14 and the front fork 13 is rotatably supported by a steering shaft (not shown) steerably supported on the head pipe 12.

At the rear ends of the rear frame 33, 33, a rear cross frame 35 is provided which interconnects the left and right rear frames 33, 33. At those portions of the rear frames 33, 33 located under the luggage box 19, a cross pipe 36 is provided which interconnects the left and right rear frames 33, 33.

Over the left and right lower frames 32, 32, left and right floor frames 37, 37 are provided by which the main frame 30 is connected with the left and right rear frames 33, 33. Rear portions of each of the floor frames 37, 37 are connected to pillion step brackets 38, 38 projecting in the vehicle width direction from the rear frames 33, 33. Pillion steps 39 (FIG. 1) on which feet of a pillion passenger seated on a rear portion of the seat 20 are to be put are attached to each of the pillion step brackets 38, 38.

A side stand bracket 53 is provided on the left lower frame 32, and a foldable side stand 54 (FIG. 1) is attached to the side stand bracket 53.

In addition, power unit connecting sections 55 to which the power unit 16 is to be connected are provided on rear surfaces of front portions of the rear frames 33, 33.

The power unit 16 has an engine 21 at the front and a transmission mechanism 22 which is continuous with a rear portion of the engine 21 and through which the rear wheel 17 is driven. The power unit 16 is swingably connected to the power unit connecting sections 55 through links 23, which are connected to front portions of the power unit 16. The power unit 16 extends rearward under the rear frames 33 and rotatably supports the rear wheel 17; thus, the power unit 16 is a unit swing type engine that functions as a swing arm for supporting the rear wheel 17.

To an upper portion of the power unit 16, an air cleaner box 25 is connected by which intake air is cleaned before being supplied to the engine 21. A muffler 28 extending from the engine 21 is disposed on the right side of the rear wheel 17.

In addition, on a left side surface of the power unit 16 a kick pedal 26 is provided which is to be kicked to start the engine 21. A main stand 27 is mounted at the lower portion of the power unit 16 for supporting the motorcycle 10 upright.

As shown in FIG. 1, the body cover 44 includes: a front cover 45 covering the front of the head pipe 12 and the main frame 30; a leg shield 46 connected to the front cover 45 and covering the rear of the head pipe 12 and the main frame 30; a step floor 47 connected to a lower portion of the leg shield 46 and covering the left and right floor frames 37, 37 from above; a floor under cover 48 connected to a lower portion of the front cover 45 and covering the step floor 47 from below; a seat under cover 49 covering the front of the luggage box 19; left and right rear covers 50 covering the rear frames 33, 33 and the luggage box 19 from lateral sides; and a tail cover 51 covering the rear side of the vehicle under the seat 20.

Left and right side portions of the floor under cover 48 cover the lower frames 32, 32 and the floor frames 37, 37 from outer sides.

The periphery of the handle 15 is covered with a handle cover 41. A front fender 42 covering the upper side of the front wheel 14 is provided on the front fork 13 while a rear fender 43 covering the upper side of the rear wheel 17 is provided under the rear cover 50.

The luggage box 19 is opened and closed with the seat 20, which can be opened and closed. A helmet H and the like can be stored in the luggage box 19. A grab bar 29 is provided around a rear portion of the seat 20. The fuel tank 24 as an energy storage box for storing a fuel for the engine 21 is disposed under the step floor 47.

Now, a support structure for the body frame 11 and the fuel tank 24 will be described in detail below.

The main frame 30 is a pipe having a circular cross-sectional shape, welded to the rear surface of the head pipe 12 and extending rearwardly downward. The main frame 30 is bent into a rearwardly projecting shape at a bend point 60 at a vertically intermediate portion thereof, and, under the bend point 60, extends forwardly downward. Thus, the main frame 30 has a main frame upper portion 61 extending rearwardly downward from the head pipe 12, the bend point 60, and a main frame lower portion 62 extending forwardly downward under the bend point 60. The main frame upper portion 61 is inclined rearwardly downward with reference to the vertical direction, whereas the main frame lower portion 62 is inclined forwardly downward with reference to the vertical direction.

Figure 5:
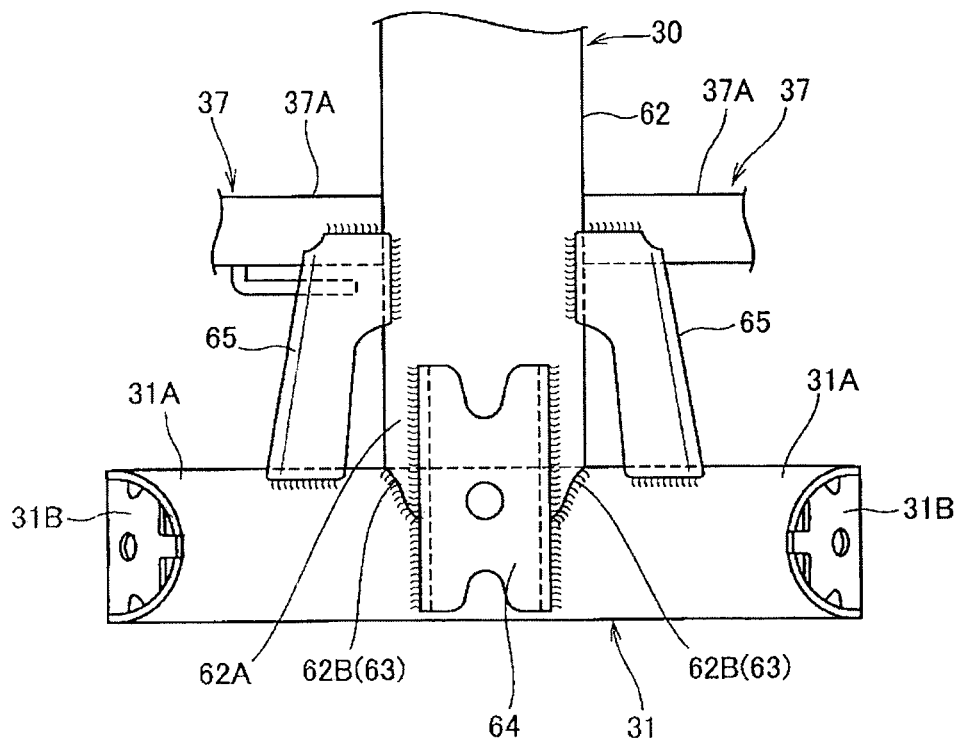
FIG. 5 is a front view, as viewed from the front side, of a joint section between a main frame and a front cross frame.

FIG. 5 is a front view, as viewed from the front side, of a joint section between the main frame 30 and the front cross frame 31.

As shown in FIGS. 2, 3 and 5, the front cross frame 31 is a single pipe having a circular cross-sectional shape and extending rectilinearly in the vehicle width direction, and an axially middle part thereof is welded to a lower end portion 62A of the main frame lower portion 62 (to a lower portion of the main frame). More specifically, cutout sections 62B cut out in an arcuate shape conforming to the shape of an outer peripheral surface of the front cross frame 31 are formed at left and right lower edges of the lower end portion 62A. The front cross frame 31 is fitted into the cutout sections 62B from below, and is joined to the main frame 30 by weld beads 63 formed along edge portions of the cutout sections 62B. Openings of left and right end portions 31A, 31A of the front cross frame 31 are closed by welding of circular disk-like lid members 31B to the end portions.

In addition, a plate-shaped reinforcement plate 64 extends between and is welded to the lower end portion 62A and the front cross frame 31. A front surface of the front cross frame 31 and a front surface of the main frame lower portion 62 are interconnected by the reinforcement plate 64.

The lower frames 32, 32 are pipes having a rectangular cross-sectional shape, welded respectively to rear surfaces of the left and right end portions 31A, 31A of the front cross frame 31 at front end portions 32C thereof, and extending rearward. The rear ends of the lower frames 32, 32 are welded to the front side of the left and right end portions of the center cross pipe 34, which is circular in cross-sectional shape. The front end portions 32C are located rearwardly of the lid members 31B, and are cut out in an arcuate shape according to the shape of the outer peripheral surface of the front cross frame 31. With the lid members 31B, 31B thus provided at the end portions 31A, 31A, enhanced rigidity is ensured. Besides, since the front end portions 32C cut out in conformity with the shape of the welds are welded to the rear of the end portions 31A, 31A in which the rigidity is enhanced, the lower frames 32, 32 can be rigidly connected to the front cross frame 31.

In addition, corner reinforcement plates 69 for connecting the rear edge of the front cross frame 31 and front inner edges of the lower frames 32, 32 to each other are welded to the joints between the end portions 31A, 31A and the lower frames 32, 32.

As shown in FIG. 4, the center cross pipe 34 is longer than the front cross frame 31 so that the width between the lower frames 32, 32 increases along the direction toward the center cross pipe 34.

Besides, as shown in FIG. 3, the lower frames 32, 32 are bent into a downwardly projecting shape so that they are provided at back-and-forth-directionally intermediate portions thereof with lowest-point parts 32A constituting the lowest points of lower surfaces of the lower frames 32, 32.

The rear frames 33, 33 are pipes that are rectangular in cross-sectional shape and welded to the upper surface side of the center cross pipe 34. As shown in FIG. 4, the rear frames 33, 33 have larger-width portions 33A which extend rearward and at which the width between the rear frames 33, 33 is larger than the width between the lower frames 32, 32, and have rear portions 33B at which the width between the rear frames 33, 33 is smaller than that of the larger-width portions 33A.

The pillion step brackets 38, 38 are pipes having a circular cross-sectional shape, welded to side surfaces of the rear frames 33, 33 at the upper side of the floor frames 37, 37, and extending rearward while projecting outward in the vehicle width direction.

The floor frames 37, 37 are pipes having a circular cross-sectional shape and supporting the step floor 47 from below. The floor frames 37, 37 include: front-side joint sections 37A welded respectively to the left and right side surfaces of the main frame lower portion 62 and extending in the vehicle width direction; front-side bent sections 37B bent in an arcuate shape from the front-side joint sections 37A toward the rear side; floor support sections 37C extending from the front-side bent sections 37B to the rear side of the rear frames 33, 33; and rear joint sections 37D (rear end portions) welded to ends of the pillion step brackets 38, 38.

As shown in FIG. 5, reinforcement pieces 65 for interconnecting the front-side joint sections 37A and the main frame lower portion 62 are welded to the front surface side of the front-side joint sections 37A. The reinforcement pieces 65 extend downward, to be welded also to an upper surface of the front cross frame 31. Thus, the front-side joint sections 37A, the main frame lower portion 62 and the front cross frame 31 are interconnected by the reinforcement pieces 65, whereby the floor frames 37, 37 and the front cross frame 31 can be rigidly welded to the main frame lower portion 62 using a small number of reinforcement members.

As shown in FIGS. 2 to 4, the floor frames 37, 37 have their front-side bent sections 37B extending vehicle-width-directionally outward beyond the lower frames 32, 32, are located on the vehicle-width-directionally outer sides than the lower frames 32, 32 at their left and right floor support sections 37C, and then extend rearward substantially in parallel to the lower frames 32, 32. Thus, the lower frames 32, 32 and the floor frames 37, 37 are located on the vehicle-width-directionally outer sides in the body frame 11. As a result, a large-width space between the left and right lower frames 32, 32 and between the left and right floor frames 37, 37 constitutes a storage space S in which a vehicle component part or an article, such as the fuel tank 24, can be disposed. The storage space S is formed between the main frame lower portion 62 as well as the front cross frame 31 and the center cross pipe 34. In the present embodiment, the fuel tank 24 is stored in the storage space S.

At inner edge portions of the front-side bent sections 37B and at inner edge portions of the floor support sections 37C, tank stays 66 project inward in the vehicle width direction. The tank stays 66 are respectively provided on the left and right floor frames 37, 37, and the fuel tank 24 is supported on the floor frames 37, 37 through the tank stays 66 at four locations.

In addition, at outer edge portions of the floor support sections 37C and at inner edge portions of the floor support sections 37C, floor stays 67 to support/connect the step floor 47 are provided, respectively.

Further, at inner edge portions of the floor support sections 37C, cross member stays 68 are provided that project inward in the vehicle width direction.

Figure 6:
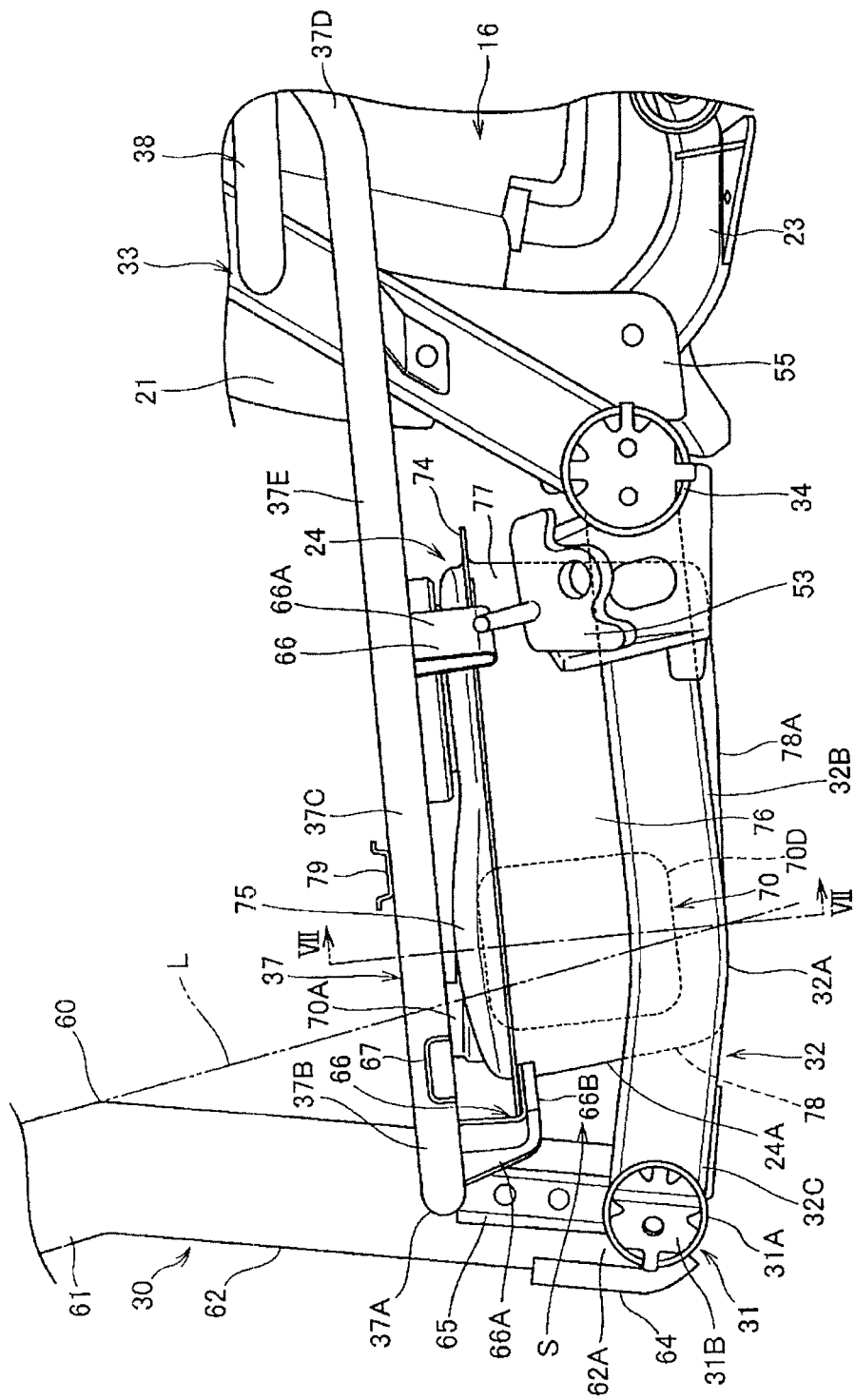
FIG. 6 is a left side view showing a state in which a fuel tank is disposed in a storage space.
Figure 7:
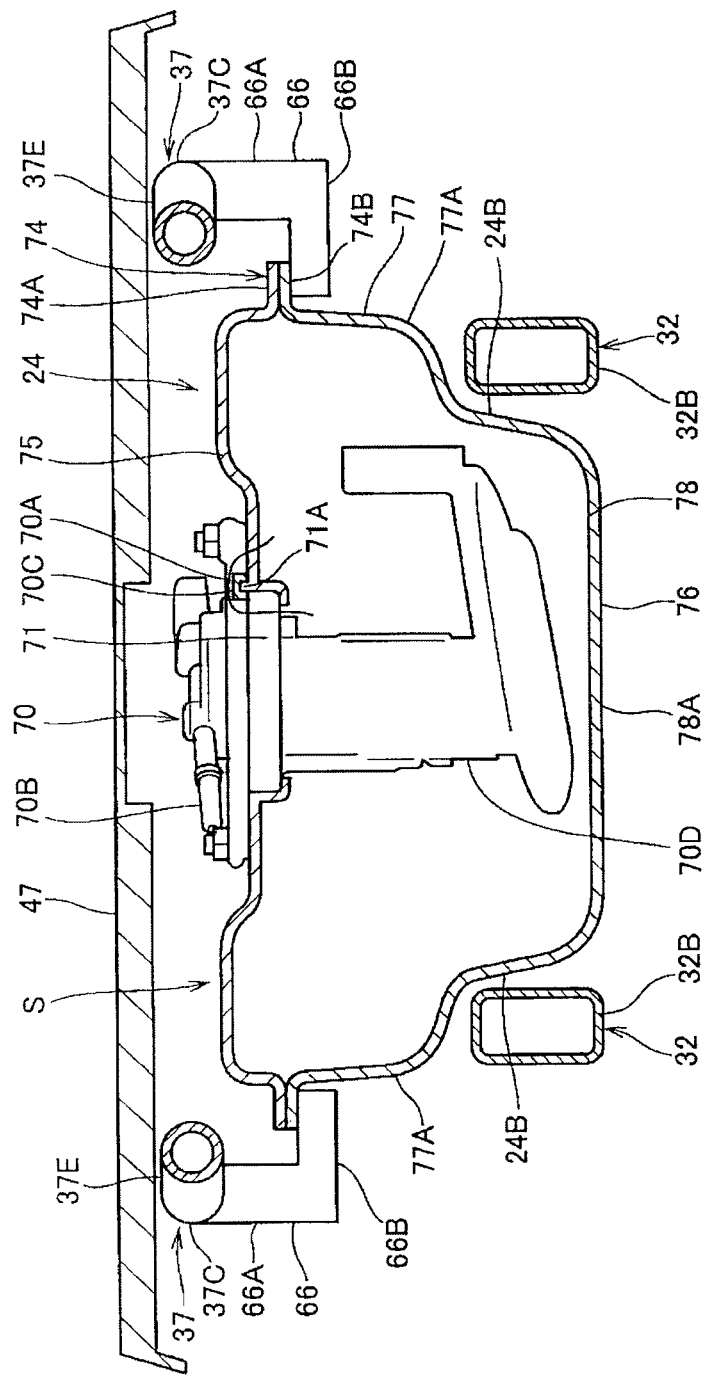
FIG. 7 is a sectional view taken along line VII-VII of FIG. 6.
Figure 8:
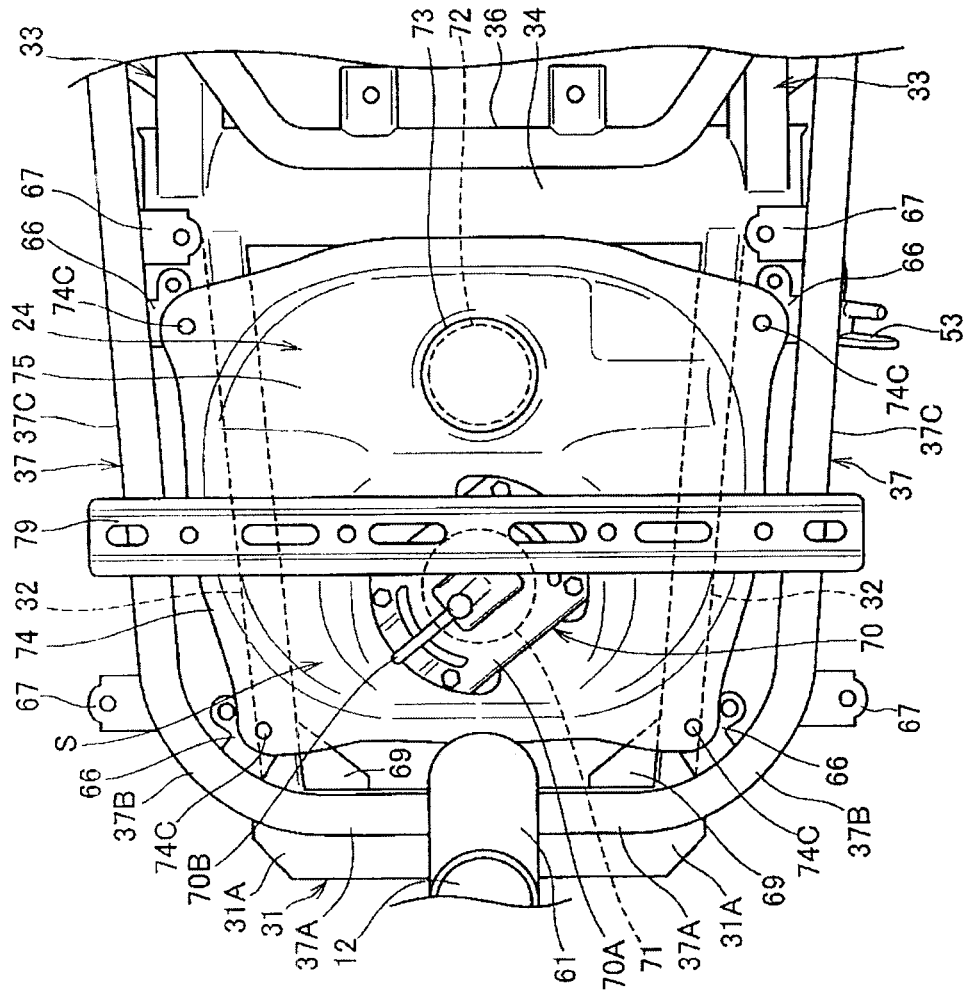
FIG. 8 is a plan view, as viewed from above, showing the state in which the fuel tank is disposed in the storage space.
Figure 9:
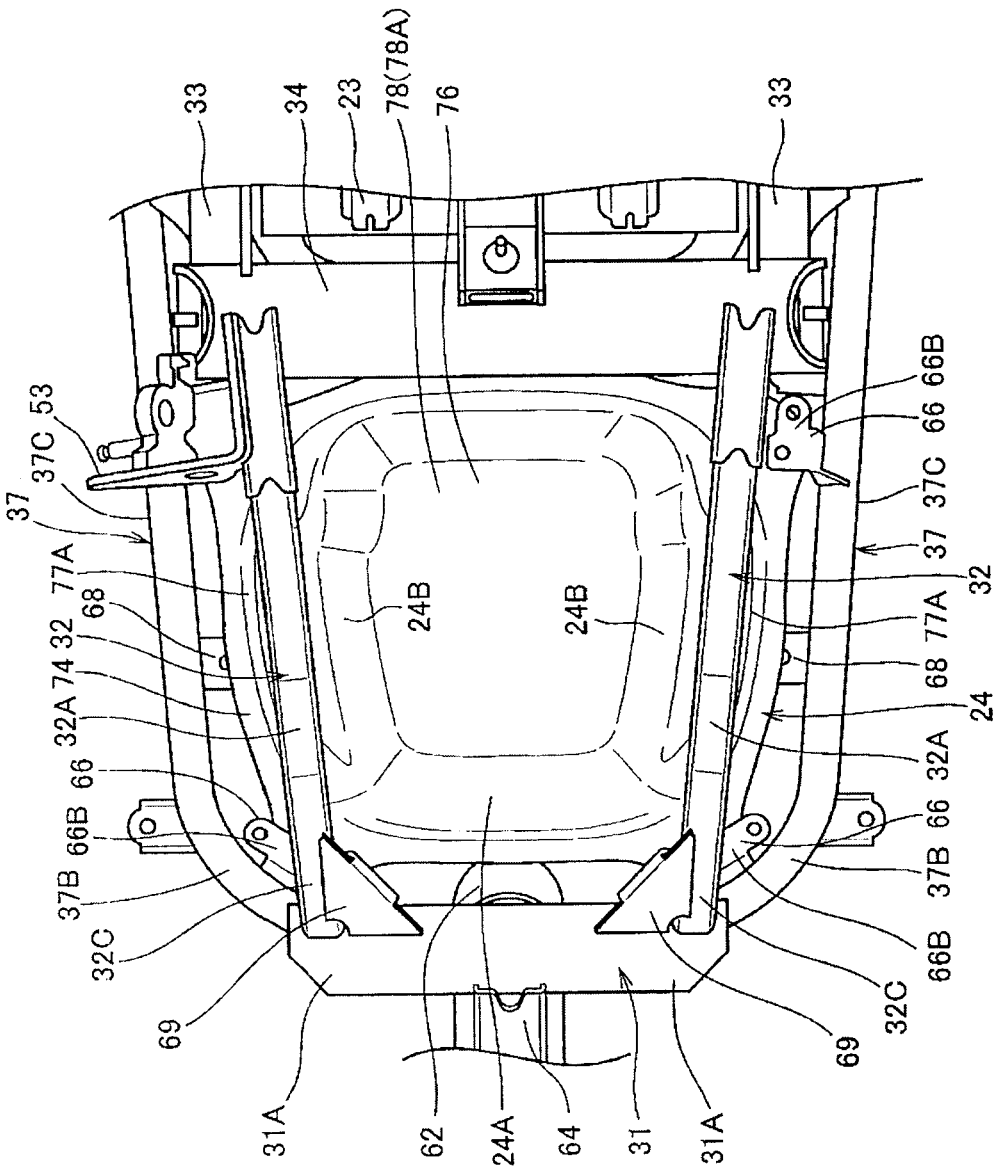
FIG. 9 is a plan view, as viewed from below, showing the state in which the fuel tank is disposed in the storage space.

FIG. 6 is a left side view showing a state in which the fuel tank 24 is disposed in the storage space S. FIG. 7 is a sectional view taken along line VII-VII of FIG. 6. FIG. 8 is a plan view, as viewed from above, showing the state in which the fuel tank 24 is disposed in the storage space S. FIG. 9 is a plan view, as viewed from below, showing the state in which the fuel tank 24 is disposed in the storage space S.

As shown in FIGS. 6 to 9, the fuel tank 24 is a box-type fuel tank in which a fuel pump 70 for supplying the engine 21 with a fuel is incorporated. The fuel tank 24 is provided at its upper surface with a pump fixing hole 71 in which the fuel pump 70 is inserted, and a circular fuel filler 72 located rearwardly of the pump fixing hole 71. The fuel filler 72 is openably closed with a filler cap 73. The fuel pump 70 is provided at an upper portion thereof with a pump fixation section 70A exposed to the outside through the pump fixing hole 71. The fuel pump 70 is fixed to the fuel tank 24 by bolts passed through the pump fixation section 70A.

The pump fixation section 70A is provided with a fuel hose connecting pipe 70B, which is connected to a fuel hose (not shown) that extends to the engine 21. The fuel pump 70 is disposed in a front portion of the fuel tank 24, and a lower portion of a pump body 70D provided inside the fuel tank 24 extends to the vicinity of a bottom surface of the fuel tank 24.

At a side surface of an upper portion of the fuel tank 24 is provided a flange section 74 that projects substantially horizontally to the outside of the fuel tank 24. The flange section 74 is provided along the whole circumference of the side surface of the fuel tank 24. The flange section 74 is formed in four corners thereof with fixing holes 74C at positions corresponding to the tank stays 66.

As shown in FIG. 7, the fuel tank 24 is formed in a box-like shape by joining together an upper half 75 constituting an upper portion and a lower half 76 constituting a lower portion. The upper half 75 and the lower half 76 are each formed by drawing of a steel sheet by use of a press die.

The upper half 75 is provided with the pump fixing hole 71, the fuel filler 72, and an upper-side flange section 74A projecting outward. The upper half 75 is formed in a roughly rectangular shape as viewed from above. The pump fixing hole 71 and the fuel filler 72 are disposed in the state of being aligned along the back-and-forth direction, in succession to and rearwardly of the head pipe 12, and are each located at vehicle-width-directionally central position.

The pump fixing hole 71 is provided with a seal engagement section 71A (FIG. 7) for engagement with a seal section 70C (FIG. 7) formed at the lower surface of the pump fixation section 70A. The seal engagement section 71A is integrally formed at the time of drawing of the upper half 75. The upper half 75 is a lid body for closing the upper side of the lower half 76, and the depth of drawing thereof is comparatively small. This ensures that, even where the seal engagement section 71A is formed by drawing, the deformation amount of the upper half 75 is not so large, so that the flatness and dimensional accuracy of the upper surface of the upper half 75 can be secured at a favorable level. Therefore, the pump fixing hole 71 and the fuel filler 72, which are required to have such a dimensional accuracy that the fuel can be hermetically enclosed, can be disposed proximate to each other, and the degree of freedom in designing can be enhanced. In addition, since the upper half 75 is a drawn product, the upper half 75 has a draft angle such that the width of its side surface portions is narrowed along the upward direction. In this embodiment, however, the depth of drawing of the upper half 75 is small and the draft angle would little influence the area of the upper surface; accordingly, a large area of the upper surface of the upper half 75 can be secured, and the degree of freedom in layout of the pump fixing hole 71 and the fuel filler 72 is enhanced.

The lower half 76 has a fuel storage section which is drawn more deeply than the upper half 75. The lower half 76 is formed in conformity with the shapes of the floor frames 37, 37 and the lower frames 32, 32 so that a large amount of fuel can be stored between the left and right floor frames 37, 37 and between the left and right lower frames 32, 32. The lower half 76 has an upper storage section 77 provided above the floor frames 37, 37 and a lower storage section 78 provided between the lower frames 32, 32. The upper storage section 77 has bulging sections 77A disposed on the inside of the floor frames 37, 37 and bulge to the outer sides relative to the outer surfaces of the lower frames 32, 32 and connect to the upper half 75. In this way the bulging sections 77A which bulge to the outer sides relative to the outer surfaces of the lower frames 32, 32 are disposed, resulting in the length of the fuel tank 24 in the vehicle width direction being greater than the length in the back-and-forth direction.

The upper storage section 77 is formed at its upper edge portion with a lower-side flange section 74B. The upper-side flange section 74A and the lower-side flange section 74B are welded to each other, whereby the flange section 74 is formed. No section, such as a hole, that requires high accuracy is arranged at the bottom surface of the lower half 76, and, therefore, the lower half 76 can easily be deep drawn.

The tank stay 66 is formed in a roughly L shape, while having a vertical section 66A extending downward from the floor frames 37, 37 and a support plate section 66B bent from the lower end of the vertical section 66A to the vehicle-width-directionally inner side. The tank stay 66 is located on the vehicle-width-directionally outer side relative to the lower frames 32, 32.

In the state in which the flange section 74 is mounted on the support plate section 66B, the fuel tank 24 is fastened to the support plate section 66B by fixing bolts (not shown) passed through the fixing holes 74C and is fixed in a predetermined position inside the storage space S. In this condition, the left and right bulging sections 77A are projecting to the outer sides relative to the lower frames 32, 32, over the whole range in the back-and-forth direction of the fuel storage section of the fuel tank 24. Since the bulging sections 77A bulging to the outer sides of the lower frames 32, 32 are thus provided, the capacity of the fuel tank 24 can be enlarged.

As shown in FIG. 9, the lower storage section 78 is located in a lower portion of the storage space S, and is surrounded by the front cross frame 31 and the center cross pipe 34 on the front and rear sides thereof and by the lower frames 32, 32 on the left and right sides thereof.

As shown in FIG. 6, the fuel tank 24 is disposed to be slightly higher on the rear side so that it is located lowest on the pump body 70D side. The lower surface 78A of the lower storage section 78 is inclined to be higher on the rear side.

The lower surface 78A of the lower storage section 78 extends to the vicinity of lower edges 32B of the lower frames 32, 32. More in detail, the lower edges 32B of the lower frames 32, 32 extend in the back-and-forth direction to be along the lower surface 78A in side view, and the lowest-point parts 32A of the lower frames 32, 32 having a downwardly projecting shape are located below the lower surface 78A, at a position just under the pump body 70D. Therefore, the lower surface 78A just under the pump body 70D can, and hence the pump body 70D can, be guarded by the lowest-point part 32A. Accordingly, it is unnecessary to reinforce the fuel pump 70, and the shape of the fuel pump 70 can be simplified. In addition, since the lowest point of the lower surface 78A is formed just below the pump body 70D and the lower surface 78A is not present below the lowest-point part 32A, the lower surface 78A can be guarded by the lowest-point part 32A. Therefore, it is unnecessary to reinforce the lower surface 78A of the fuel tank 24, and the shape of the fuel tank 24 can be made simpler.

The fuel tank 24 is supported in the manner of being hung from the floor frames 37, 37 through the tank stays 66, and upper edges 37E of the floor frames 37, 37 are located above the upper surface of the fuel tank 24 and the upper surface of the pump fixation section 70A in side view. In other words, the fuel tank 24 and the fuel pump 70 are provided below the step floor 47 supported on the upper edges 37E. Therefore, the fuel tank 24 and the fuel pump 70 are guarded by the floor frames 37, 37 and the step floor 47. Consequently, the fuel pump 70 can be simplified.

In addition, a plate-shaped cross member 79 extends in the vehicle width direction between the floor frames 37, 37. The cross member 79 is located over the pump fixation section 70A, thereby covering the pump fixation section 70A from above. The cross member 79 is disposed below the step floor 47, and is fastened to the cross member stays 68 (FIG. 4). The step floor 47 is supported from below by the cross member 79 over its range in the vehicle width direction, so that the step floor 47 can be prevented from bending largely downward.

As shown in FIG. 7, the floor frames 37, 37 are sub-frames which bear the weight of the fuel tank 24 and the load acting on the step floor 47. The diameter of each of the floor frames 37, 37 is set to be smaller than the width of each of the lower frames 32, 32. With the floor frames 37, 37 having a small diameter, the bulging sections 77A of the fuel tank 24 can be extended more toward the floor frame 37. 37 sides, whereby the capacity of the fuel tank 24 can be enlarged.

In addition, since the lower frames 32, 32 are rectangular pipes having a rectangular cross-sectional shape that is elongated in the vertical direction, the spaces occupied by the lower frames 32, 32 in the vehicle width direction can be reduced while securing rigidity. Therefore, the lower storage section 78 can be disposed closer to the lower frame 32, 32 sides to thereby enlarge the capacity of the fuel tank 24, and the amount of projection of the lower frames 32, 32 outward in the vehicle width direction can be reduced. Consequently, a large bank angle can be secured for the vehicle.

Further, since the fuel tank 24 is fixed in the manner of being hung from the floor frames 37, 37, the rigidity of the fuel tank 24 is less liable to affect the rigidity of the body frame 11. Accordingly, rigidity designing for the body frame 11 can be accomplished easily.

In the present embodiment, the flange section 74 is secured to the tank stays 66, whereby the fuel tank 24 is fixed in the manner of being hung from the floor frames 37, 37 above the lower frames 32, 32. Therefore, the flange section 74 constituting a parting face between the upper half 75 and the lower half 76 can be located at a higher position. This ensures that as above-mentioned, the depth of drawing of the upper half 75 can be made smaller, and formability of the upper half 75 is enhanced. Accordingly, the flatness and dimensional accuracy of the upper surface of the upper half 75 can be secured at satisfactory levels. As a result, the pump fixing hole 71 and the fuel filler 72 can be disposed proximate to each other, so that the degree of freedom in design can be enhanced.

The rear joint sections 37D of the floor frames 37, 37 are supported by the pillion step brackets 38, 38 which project toward the vehicle-width-directionally outer sides from the rear frames 33, 33. Therefore, it is unnecessary to provide exclusive members for supporting rear end portions of the floor frames 37, 37, which project toward the vehicle-width-directionally outer sides. Thus, the floor frames 37, 37 can be supported with a simple structure.

As shown in FIGS. 6, 8 and 9, the front end portions 32C of the lower frames 32, 32 are welded to the left and right end portions 31A, 31A of the front cross frame 31, which is welded to the main frame lower portion 62 and extends rectilinearly along the vehicle width direction. Therefore, no large bent portions are formed in the vicinity of the joints between the end portions 31A, 31A and the front end portions 32C of the lower frames 32, 32. This ensures that a front surface 24A of the fuel tank 24 can be disposed more proximate to the front cross frame 31, and the left and right side surfaces 24B of the fuel tank 24 can be disposed more proximate to the inner edges of the lower frames 32, 32. Consequently, the fuel tank 24 can be enlarged in capacity.

As shown in FIGS. 3 and 6, the main frame 30 is bent in a rearwardly projecting shape at the bend point 60 in the vicinity of a height-directionally middle part thereof, and the main frame lower portion 62 extends forwardly downward. Therefore, the main frame lower portion 62 can be disposed on the more forward side while keeping the main frame lower portion 62 from coming too close to the front wheel 14, and the storage space S can be extended more forward while securing a clearance between the front wheel 14 and the main frame 30. This makes it possible to enlarge the capacity of the fuel tank 24. In addition, since the storage space S is extended forward by bending the main frame lower portion 62 toward the front side, the storage space S can be enlarged without influencing the wheel base between the front wheel 14 and the rear wheel 17.

Here, the shape of the main frame 30 is so set that a sufficient clearance can be secured between the front wheel 14 and the main frame 30 when a large stroke of the front fork 13 is made. In view of this, in order that the bend at the bend point 60 will not heavily affect the clearance, it is preferable to provide the bend point 60 in the vicinity of the height-directionally middle part or at a position below the middle part of the main frame 30.

In addition, as shown in FIG. 6, the main frame lower portion 62 extends forwardly downward, so that the storage space S is broadened toward the front side by an amount according to the forward inclination of the main frame lower portion 62. Specifically, the front portion of the storage space S is disposed to range up to the front side relative to a position on the extension line L of the rear edge of the main frame upper portion 61 which is above the bend point 60. Therefore, the fuel tank 24 can be extended more forward, whereby the capacity of the fuel tank 24 can be enlarged.

As shown in FIG. 1, the space which is on the front lower side of the seat 20 and is surrounded by the leg shield 46, the step floor 47 and the seat under cover 49 constitutes a leg-passing space K through which the driver to be seated on the seat 20 can let his or her leg pass from one side to the other side of the vehicle at the time of getting on or off the vehicle. A front portion of the leg-passing space K is partitioned by the leg shield 46 which covers the rear of the head pipe 12 and the main frame 30. The leg shield 46 includes a front slant section 46A extending rearwardly downward along the rear edge of the main frame upper portion 61, and a rear slant section 46B extending forwardly downward along a rear edge of the main frame lower portion 62. The rear slant section 46B extends to below the bend point 60, to be connected to the step floor 47. Since the leg shield 46 is thus provided with the rear slant section 46B along the main frame lower portion 62 extending forwardly downward from the bend point 60, a lower portion of the leg-passing space K can be broadened by extending it more forward, whereby the driver is permitted to get on and off the motorcycle 10 more easily.

As has been described above, according to the embodiment to which the present invention is applied, the storage space S is provided between the pair of left and right lower frames 32, 32 extending rearward from a lower portion of the main frame 30, and the front end portions 32C of the lower frames 32, 32 are connected to the left and right end portions 31A, 31A of the front cross frame 31, which is connected to the lower end portion 62A of the main frame lower portion 62 and extends in the vehicle width direction. Therefore, the front end portions 32C of the lower frames 32, 32 can be extended more forward and can be disposed on the more outer sides in the vehicle width direction. Consequently, a larger storage space S can be secured with a simple structure.

In addition, with the main frame 30 bent in a rearwardly projecting shape at the bend point 60 located in the vicinity of the height-directionally middle part thereof, the main frame lower portion 62 can be disposed on the more forward side while preventing the main frame lower portion 62 from coming too close to the front wheel 14. Therefore, the storage space S can be extended more forward while securing a clearance between the front wheel 14 and the main frame 30, whereby an enlarged capacity of the storage space S can be secured.

Besides, in side view, the storage space S is disposed to range forward beyond the extension line L of the rear edge of the main frame upper portion 61 above the bend point 60 of the main frame 30, and the space obtained by bending the main frame 30 forward can be used as the storage space S. Accordingly, an enlarged capacity of the storage space S can be secured with a simple structure.

Further, the main frame lower portion 62 constituting a part below the bend point 60 of the main frame 30 extend forwardly downward, and the main frame lower portion 62 is located on the more forward side, so that a larger capacity of the storage space S can be secured.

Furthermore, since the fuel tank 24 as the energy storage box is disposed in the storage space S, the capacity of the fuel tank 24 can be increased, and the fuel tank 24 being comparatively large in weight and volume can be disposed in the center of the vehicle body. This promises mass concentration.

In addition, since the lower frames 32, 32 extend rearward such that their lower edges 32B extent along the lower surface 78A of the fuel tank 24, the storage space S in which to dispose the fuel tank 24 can be secured in a maximized manner.

Besides, since the lower frames 32, 32 are bent in a downwardly projecting shape such that their lowest-point parts 32A are located in the vicinity of the pump body 70D in side view, the pump body 70D can be guarded by the lower frames 32, 32. As a result, the fuel pump 70 can be made simple in structure.

In addition, the leg-passing space K between the seat 20 and the head pipe 12 is disposed to range to below the bend point 60, a lower portion of the leg-passing space K can be broadened by extending it more forward. This permits the driver to get on and off the motorcycle 10 more easily.

Further, by providing the lid members 31B, it is possible to enhance the rigidity of the left and right end portions 31A, 31A of the front cross frame 31. Besides the front end portions 32C of the lower frames 32, 32, which are cut out in conformity with the shape of the rear surface of the front cross frame and are welded to the left and right end portions 31A, 31A of the front cross frame 31, so that the lower frames 32, 32 can be rigidly joined to the front cross frame 31.

Incidentally, the above-described embodiment merely shows a mode of application of the present invention, and the invention is not to be restricted to the above embodiment.

While the storage space S has been described as a space for disposing the fuel tank 24 therein in the above embodiment, this is not restrictive of the present invention. For example, a small-article container may be provided in the storage space S, and such articles as driver's belongings may be stored in the small-article container.

In addition, while a configuration in which the fuel tank 24 as an energy storage box is disposed in the storage space S has been described in the embodiment above, this is not restrictive of the present invention. A battery for driving a driving motor of an electrically driven saddle type vehicle may be stored in the storage space S.

Besides, the front cross frame 31 has been described to singularly extend rectilinearly along the vehicle width direction in the above embodiment, this is not a restrictive configuration. Left and right front cross frames may be joined to left and right side surfaces of the main frame lower portion 62 so as to extend in the vehicle width direction.

What is claimed is:

1. A saddle type vehicle comprising a head pipe that steerably supports a steering system including a front wheel, a main frame extending rearwardly downward from said head pipe, a front cross frame connected to a lower portion of said main frame and extending in a vehicle width direction, left and right lower frames spaced apart from each other in the vehicle width direction and having front end portions connected to left and right end portions of said front cross frame, respectively, such that said left and right lower frames extend rearward from the front cross frame, and a storage space defined between at least said left and right lower frames and a rear side of said main frame, said storage space permitting a vehicle component part or an article to be disposed therein, wherein said main frame, which has a length direction defined between an upper end and a lower end thereof and a mid point located midway between said upper end and said lower end, is bent in a rearwardly projecting shape at a bend point, said bend point being located at a position equal to, or below, the mid point of said main frame, wherein said main frame comprises an upper portion above said bend point and the lower portion below said bend point, and wherein said lower portion extends forwardly downward from the bend point.

2. The saddle type vehicle according to claim 1, wherein an energy storage box is disposed in said storage space.

3. The saddle type vehicle according to claim 2, wherein said left and right lower frames are disposed to extend rearward such that lower edges of said left and right lower frames extend along a lower surface of said energy storage box.

4. The saddle type vehicle according to claim 2, wherein said energy storage box is a fuel tank provided with a fuel pump, and said left and right lower frames are each bent in a downwardly projecting shape so as to have a lowest point thereof at a position in a vicinity of the fuel pump.

5. The saddle type vehicle according to claim 1, wherein said storage space extends in front of an extension line of the upper portion.

6. The saddle type vehicle according to claim 1, wherein a leg-passing space through which a driver can let his or her leg pass from one side to an other side of the vehicle at a time of getting on or off the vehicle is provided between a driver seat and said head pipe, and said leg-passing space extends below said bend point.

7. The saddle type vehicle according to claim 1, wherein said front cross frame is a single pipe extending rectilinearly in the vehicle width direction, openings at said left and right end portions of said front cross frame are closed with lid members, said left and right lower frames have their front end portions welded to respective rear surfaces of said left and right end portions of said front cross frame, and said front end portion of said left lower frame being shaped to conform with a shape of the rear surface of said left end portion of said front cross frame and said front end portion of said right lower frame being shaped to conform with a shape of the rear surface of said right end portion of said front cross frame.

8. A saddle type vehicle comprising a head pipe that steerably supports a steering system including a front wheel, a main frame extending rearwardly downward from said head pipe, a front cross frame connected to a lower portion of said main frame and extending in a vehicle width direction, left and right lower frames spaced apart from each other in the vehicle width direction and having front end portions connected to left and right end portions of said front cross frame, respectively, such that said left and right lower frames extend rearward from the front cross frame, and a storage space defined between at least said left and right lower frames and a rear side of said main frame, said storage space permitting a vehicle component part or an article to be disposed therein,
wherein said front cross frame is a single pipe extending rectilinearly in the vehicle width direction, openings at said left and right end portions of said front cross frame are closed with lid members, said left and right lower frames have their front end portions welded to respective rear surfaces of said left and right end portions of said front cross frame, and said front end portion of said left lower frame being shaped to conform with a shape of the rear surface of said left end portion of said front cross frame and said front end portion of said right lower frame being shaped to conform with a shape of the rear surface of said right end portion of said front cross frame.

9. The saddle type vehicle according to claim 8, wherein said main frame, which has a length direction defined between an upper end and a lower end thereof and a mid point located midway between said upper end and said lower end, is bent at a bend point, wherein said main frame comprises an upper portion above said bend point and the lower portion below said bend point, and wherein said storage space extends in front of an extension line of the main frame upper portion.

10. The saddle type vehicle according to claim 9, wherein the lower portion extends forwardly downward from the bend point.

11. The saddle type vehicle according to claim 10, wherein an energy storage box is disposed in said storage space.

12. The saddle type vehicle according to claim 11, wherein said left and right lower frames are disposed to extend rearward such that lower edges of the left and right lower frames extend along a lower surface of said energy storage box.

13. The saddle type vehicle according to claim 12, wherein said energy storage box is a fuel tank provided with a fuel pump, and said left and right lower frames are each bent in a downwardly projecting shape so as to have a lowest point thereof at a position in a vicinity of the fuel pump.

14. The saddle type vehicle according to claim 13, wherein a leg-passing space through which a driver can let his or her leg pass from one side to an other side of the vehicle at a time of getting on or off the vehicle is provided between a driver seat and said head pipe, and said leg-passing space extends below said bend point.

* * * * *